(12) United States Patent
Stamatelakis et al.

(10) Patent No.: US 6,404,734 B1
(45) Date of Patent: Jun. 11, 2002

(54) SCALABLE NETWORK RESTORATION DEVICE

(75) Inventors: Demetrios Stamatelakis; Wayne D. Grover, both of Edmonton (CA)

(73) Assignee: Telecommuncations Research Laboratories, Edmonton (CA)

( * ) Notice: Subject to any disclaimer, the term of this patent is extended or adjusted under 35 U.S.C. 154(b) by 0 days.

(21) Appl. No.: 09/167,409

(22) Filed: Oct. 6, 1998

(51) Int. Cl.[7] .............................................. G01R 31/08
(52) U.S. Cl. ...................................... 370/227; 370/222
(58) Field of Search ................................ 370/225, 228, 370/252, 248, 351, 400, 462, 222, 227

(56) References Cited

U.S. PATENT DOCUMENTS

| | | |
|---|---|---|
| 4,956,835 A | 9/1990 | Grover |
| 4,993,015 A | 2/1991 | Fite, Jr. |
| 5,065,399 A | 11/1991 | Hasegawa et al. |
| 5,093,824 A | 3/1992 | Coan et al. |
| 5,146,452 A | 9/1992 | Pekarske |
| 5,173,689 A | 12/1992 | Kusano |
| 5,218,601 A | 6/1993 | Chujo et al. |
| 5,235,599 A | 8/1993 | Nishimura et al. |
| 5,239,537 A | 8/1993 | Sakauchi |
| 5,435,003 A | 7/1995 | Chng et al. |
| 5,444,693 A | 8/1995 | Arslan et al. |
| 5,495,471 A | 2/1996 | Chow et al. |
| 5,513,345 A | 4/1996 | Sato et al. |
| 5,537,532 A | 7/1996 | Chng et al. |
| 5,548,639 A | 8/1996 | Ogura et al. |
| 5,590,119 A | 12/1996 | Moran et al. |
| 5,604,868 A | 2/1997 | Komine et al. |
| 5,812,524 A | 9/1998 | Moran et al. |
| 5,835,482 A | 11/1998 | Allen |
| 5,884,017 A * | 3/1999 | Fee ................................. 714/4 |
| 5,999,286 A | 12/1999 | Venkatesan |
| 6,044,064 A | 3/2000 | Brimmage et al. |
| 6,047,331 A | 4/2000 | Medard et al. |
| 6,049,529 A | 4/2000 | Brimmage |
| 6,052,796 A | 4/2000 | Croslin |
| 6,154,296 A * | 11/2000 | Elahmadi et al. ........... 359/119 |

FOREIGN PATENT DOCUMENTS

| | | |
|---|---|---|
| GB | 2 299 729 A | 10/1996 |
| GB | 2 305 811 A | 4/1997 |

OTHER PUBLICATIONS

Baker, J.E., A Distributed Link Restoration Algorithm With Robust Preplanning, Proc. IEEE Globecom '91, pp. 306–311 (Dec. 1991).

(List continued on next page.)

Primary Examiner—Wellington Chin
Assistant Examiner—Brenda Pham
(74) Attorney, Agent, or Firm—Christensen O'connor; Johnson Kindness PLLC

(57) ABSTRACT

Tis invention provides a 'capacity slice' nodal switching device (in the ADM-like sense) that is designed for deployment under the p-cycle concept. The device's key architectural properties are access, east and west interfaces, with one spare and working port, on each of these interface sides, plus at least two straddling side interfaces. The straddling side interfaces each have equal line capacity to those of east and west interfaces, but all are usable for working capacity. In application, the plug cards in the nodal switching device are supplied to provide up to two line signal units on the straddling side of the p-cycle device, per diverse span arriving at the site. Network level deployment and configuration of the devices requires that they be arranged in p-cycles.

14 Claims, 8 Drawing Sheets

OTHER PUBLICATIONS

Chao, C.W., Dollard, P.M., Weythman, J.E. Nguyen, L.T., Eslambolchi, H. FASTAR–A Robust System for Fast DS3 Restoration, Proc. IEEE Globecom '91, pp. 39.1.1–39.1.5 (Dec. 1991).

Chow, C.E., Bicknell, J.D., McCaughey, S., Performance Analysis Of Fast Distributed Link Restoration Algorithms, International Journal of Communication Systems, vol. 8, pp. 325–345 (1995).

Chujo, T., Komine, H., Miyazaki, K., Ogura, T., Soejima, T., Distributed Self–Healing Network And Its Optimum Spare Capacity Assignment Algorithm, Electronics and Communications In Japan, Part 1, vol. 74, No. 7, pp. 1–8 (1991).

Coan, B.A., et al., Using Distributed Topology Updates And Preplanned Configurations To Achieve Trunk Network Survivability, IEEE Transaction on Reliability, vol. 40, No. 4, pp. 404–416, 427 (1991).

Coan, B.A., Vecchi, M.P., Wu, L.T., A Distributed Protocol To Improve The Survivability Of Trunk Networks, Proceedings of the 13th International Switching Symposium, pp. 173–179 (May 1990).

Fujii, H., Yoshikai, N., Restoration Message Transfer Mechanism And Restoration Characteristics Of Double–Search Self–Healing Atm Network, IEEE J–SAC Special Issue: Integrity of Public Telecommunication Networks, vol. 12, No. 1, pp. 149–158 (Jan. 1994).

Grover, W.D., Distributed Restoration Of The Transport Network, Telecommunications Network Management into the 21st Century—Techniques, Standards, Technologies, and Applications, edited by S. Aidarous and T. Pelvyak, IEEE Press, New York, NY, Chapter 11, pp. 337–427 (1994).

Information Sheet on Existing Telco Digital Cross–Connect Switch (DCS), prior to Oct. 20, 1997.

Iraschko, R.R., MacGregor, M.H., Grover, W.D., Optimal Capacity Placement For Path Restoration In Mesh Survivable Networks, Proc. IEEE ICC '96 (Jun. 1996).

Iraschko, R.R., Path Restorable Networks, Ph.D. Dissertation, University of Alberta (Spring 1997).

Kawmaura, R., Sato, K., Tokiawa, I., Self–Healing Atm Networks Based On Virtual Path Concept, IEEE J–SAC Special Issue: Integrity of Public Telecommunication Networks, vol. 12, No. 1, pp. 120–127 (Jan. 1994).

Komine, H., Chujo, T., Ogura, T., Miyazaki, K., Soejima, T., A Distributed Restoration Algorithm For Multiple–Link And Node Failures Of Transport Networks, Proc. IEEE Globecom '90, pp. 459–463 (Dec. 1990).

Sakauchi, H., Nishimura, Y., Hasegawa, S., A Self–Healing Network With An Economical Spare–Channel Assignment, Proc. IEEE Globecom '90, pp. 438–443 (Dec. 1990).

Saniee, I., Optimal Routing Designs In Self–Healing Communications Networks, Bellcore, MRE 2D–362, 445 South Street, Morristown, NJ 07960–6438, fourth draft (May 1994).

Stamatelakis, D., Theory and Algorithms for Preconfiguration of Spare Capacity in Mesh Restorable Networks, Thesis, University of Alberta, Edmonton, catalogued on Sep. 11, 1997.

United States Patent Application No. 08/893,491, filed Jul. 11, 1997, entitled: Distributed Preconfiguration of Spare Capacity in Closed Paths for Network Restoration, copy not supplied.

Ward, Mark, There's An Ant In My Phone . . ., New Scientist, pp. 32–35 (Jan. 24, 1998).

Wu, Tsong–Ho, Fiber Network Service Survivability, Artech House, Boston, pp. 1–15, 123–211 (1992).

Yang, C.H., Hasegawa, S., Fitness: Failure Immunization Technology For Network Service Survivability, Proc. IEEE Globecom '88, pp. 47.3.1–47.3.5 (Dec. 1988).

Introduction to Sonet Networking, Northern Telcom, 44 pages. Oct. 1996.

Fiber Network Service Survivability, Tson–Ho Wu, Chapter I, pp. 1–15, Chapter 4 pp. 123–210, 1992.

Telecommunications Network Managment into the 21st Centyury, Techniques, Standards, Technologies, and Applications, Chapter 11, Distributed Restoration of the Transport Network, pp. 337–417, IEEE Press, 1993.

Cycle–Oriented Distributed Preconfiguration: Ring–like Speed with Mesh–like Capacity for Self–planning Network Restoration, Wayne D. Grover Demetrios Stamatelakis, ICC'98, 7 pages.

Self–Organizing Closed Path Configuration of Restoration Capacity in Broadband Mesh Transport Networks, W. D. Grover, D. Stamatelakis, CCBR'98, 12 pages.

Potential for spare capacity preconnection to reduce cross-connection workloads in mesh–restorable networks, W. D. Grover, M. H. MacGregor, Electronics Letters, Feb. 3, 1994, vol. 30., No. 3, pp. 194–195.

An Optimal Spare–Capacity Assignment Model for Survivable Networks with Hop Limits, Meir Herzberg and Stephen J. Bye, Telecom Australia Research Laboratories, 6 pages, Proceedings of IEEE Globecom '94, vol. 3, IEEE, 1994, pp. 1601–1606.

Aphotocopy of Canadian patent application No. 2,161,847, filed Oct. 31, 1995, (published May 1, 1997), includeing drawings and filing Certificate, corresponding to U.S. patent application No. 08/551,709, filed Nov. 1, 1995, 32 pages, now United States Patent No. 5,850,505, issued Dec. 15, 1998.

* cited by examiner

SCALABLE NETWORK RESTORATION DEVICE

FIELD OF THE INVENTION:

This invention relates to restoration of capacity in a network, particularly a telecommunications network.

BACKGROUND OF THE INVENTION:

Cycle-oriented preconfiguration of spare capacity is a recent idea originated at TRLabs for the design and operation of restorable networks. It offers a valuable combination of attributes, mainly: it retains the capacity-efficiency of a mesh-restorable network, but it requires that only two nodes, the end nodes next to the fault, perform cross-connections for restoration. Moreover these nodes learn or can be told in advance what switching actions will be required, in detail, for any prospective failure. They can, thus, perform restoration switching in a manner that is essentially similar in function and speed to bi-directional line switched rings. This is thought to be a valuable combination of the best features from prior ring and mesh restoration principles. The work so far done on this scheme has been reported this June at two conferences and described in a patent application [1. W. D. Grover, D. Stamatelakis, "Cycle-Oriented Distributed Preconfiguration: Ring-like Speed with Mesh-like Capacity for Self-planning Network Restoration," Proceedings of IEEE International Conf. On Communications (ICC'98), Atlanta, June 1998, pp 537–543, 2. W. D. Grover, D. Stamatelakis, "Self-organizing closed path configuration of restoration capacity in broadband and mesh transport networks," Proceedings of IEEE—Nortel Can. Conf. Broadband Research (CCBR'98), Ottawa, June 1998, pp. 145–156 and 3. U.S. patent application Ser. No. 08/893,491, which was filed Jul. 11, 1997].

These works describe the use of a nodal switching device at nodes of the networks being configured for restoration. A digital cross-connect switch (DCS) is given as an example. A DCS is a technically sound option for deployment. However, DCS machines continue to be relatively expensive investments for network operators. With the recent advent of dense wave division multiplexing (DWDM) on the fiber optic transmission systems between nodes, it may be more economic in practice to have a specialized nodal switching device to support the p-cycle restoration scheme.

SUMMARY OF THE INVENTION

Our main purpose in the present patent proposal is fairly singular and direct; it is to protect the unique and unobvious structure of a fixed-capacity nodal device suited to the p-cycle restoration concept.

In summary, this invention provides a 'capacity slice' nodal switching device (in the ADM-like sense) that is designed for deployment under the p-cycle concept. The device's key architectural properties are access, east and west interfaces, with one spare and working port, on each of these interface sides, plus at least two straddling side interfaces. The straddling side interfaces each have equal line capacity to those of east and west interfaces, but all are usable for working capacity. In application, the plug cards in the nodal switching device are supplied to provide up to two line signal units on the straddling side of the p-cycle device, per diverse span arriving at the site. Network level deployment and configuration of the devices requires that they be arranged in p-cycles according to the theory in our prior papers (1, 2 and 3).

BRIEF DESCRIPTION OF THE DRAWINGS

There will now be described a preferred embodiment of the invention with reference to the figures, by way of example, without intending to limit the generality of the invention, in which figures like reference characters denote like elements, and in which.

DETAILED DESCRIPTION OF PREFERRED EMBODIMENTS OF THE INVENTION

Figure 1:
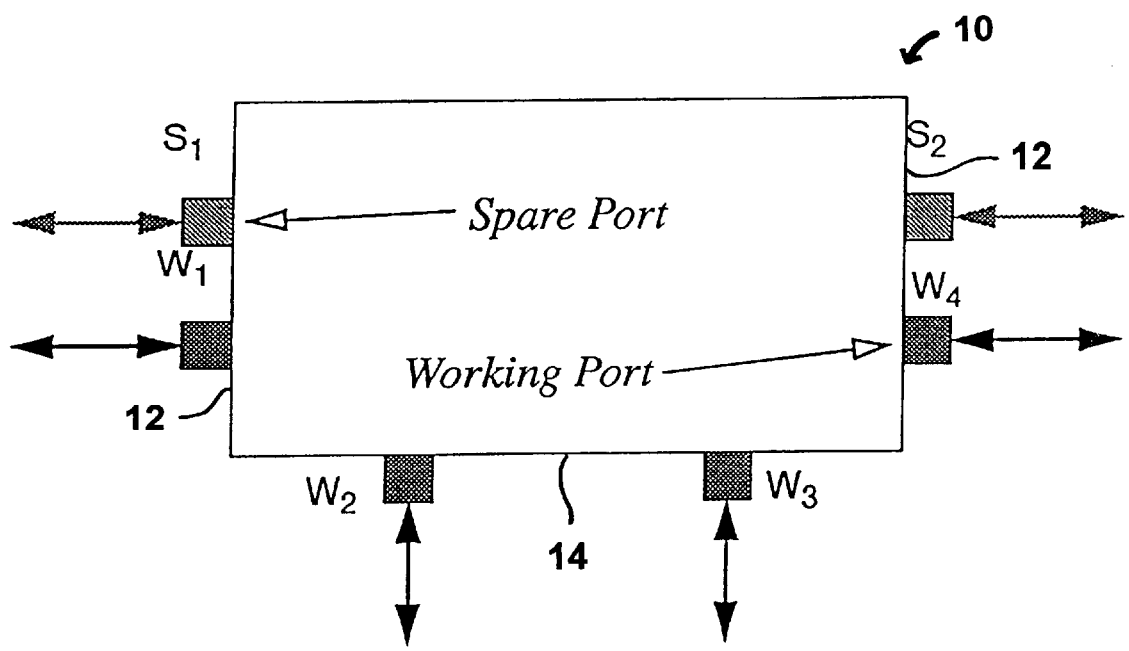
FIG. 1 is a schematic showing the structure of a nodal switching device according to the invention.
Figure 2:
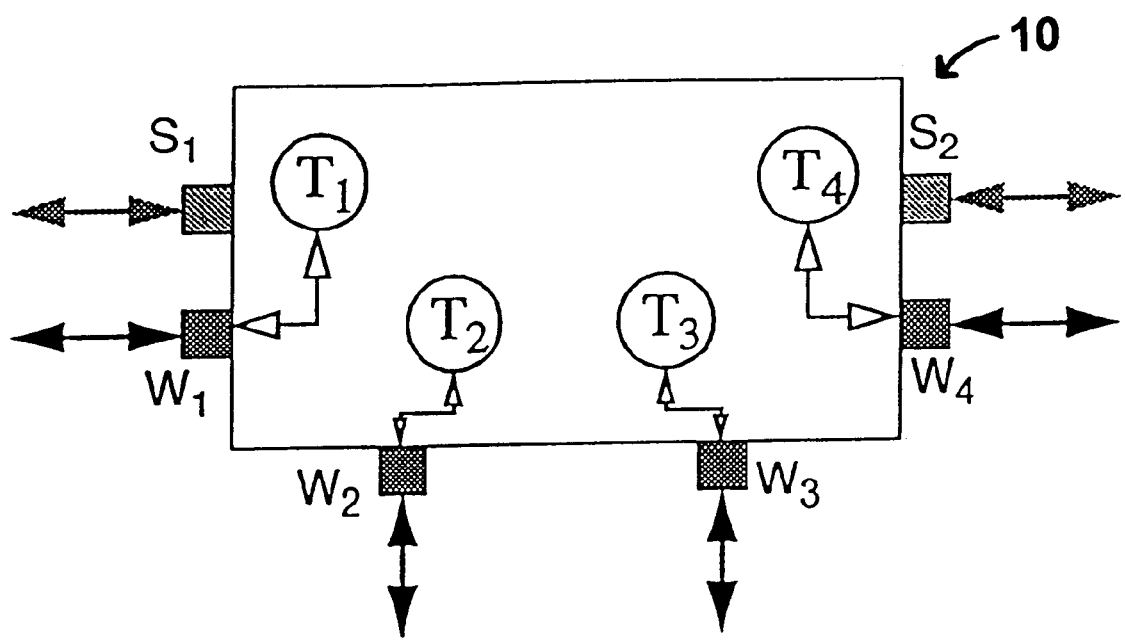
FIG. 2 is a schematic showing internal traffic assignment in the nodal switching device of FIG. 1.

In FIG. 1, S1 is a spare (east) port, S2 is a spare (west) port, W1 is a working (east) port, W2 and W3 are working (south) ports and W4 is a working (west) port. The ports are shown logically separated, but each pair may share a single multiplexed digital signal. For, example each pair (east, west or south) could split the available payload in a single bidirectional OC-48 line. The three "sides" of the device are referred to as East, West and South (North being omitted but would be a placeholder for the local input/output access to working signals). These names are really, more generally, the designations of particular interfaces that are defined when the device is placed as part of a p-cycle (as defined in references 1, 2 and 3). That is, "East" and "West" (where both spare and working appear) are the interfaces to on-cycle spans of the respective p-cycle. The South (or "all working") interface is the interface to straddling spans of the respective p-cycle which the nodal switching device terminates. This leads to a generalization of the device configuration, where a p-cycle device of a given bandwidth is placed at a node where several spatially diverse straddling spans converge (see nodal switching device 10A in FIG. 3 and the discussion below).

The nodal switching device 10 shown in FIG. 1 has 'line-oriented' interfaces 12 to transmission systems arriving from three spatially distinct sources or directions. These may be SONET OC-n or D-WDM terminating interfaces. Like the nodal element for a SONET BLSR (an ADM) two of these line-oriented interfaces are divided into one-half for working traffic demand and one-half for spare (restoration) capacity. (e.g. two OC-n fiber pairs in a BLSR/4 or two OC-n/2 channel groups in a BLSR/2). These interfaces are designated east and west. Unlike a SONET ADM, the proposed device has on its third line-oriented interface 14, an equal total capacity to each of the other line interfaces 12 but all of the capacity on the interface 14 is used for working demands. There is no spare capacity allocation on the third line interface 14.

The nodal switching device 10 therefore has an asymmetric (2×W on one side, and 2 sides of {1W, 1S}) structure.

The nodal switching device 10 also has local traffic (functioning as an add-drop multiplexer) or may be full line-rate copies of the working signals for connection into other transport systems or local termination equipment.

Lines connecting ports within and outside the nodal switching devices described herein are all conventional communication links.

Internal traffic management in the nodal switching device 10 will depend on a particular application. For the purposes of showing how traffic is restored with such a device, the traffic going into and out of each working link is depicted as an internal traffic source/sink T1–T4 which are provided from the Local Interface ports of the nodal switching device 10.

The nodal switching device 10 has the following basic functions:
1. No failures: Connect all working ports to/from the local working demand input/output ports (or internal add-drop multiplex tributary selector). Also, connect spare (east) to/from spare (west) to support failures on spans at other nodes and support ADM cooperation.
2. Failure of east cable span: Connect working (east) to/from spare (west).
3. Failure of west cable span: Connect working (west) to/from spare (east).
4. Failure of 'south' cable span: Connect working (south A) to/from spare (west) AND connect working (south B) to/from spare (east)

All connect actions are referred to as "to/from", to recognize that all the signal flows involved are actually bidirectional. Functions 2 and 3 are, by themselves, conventional functions of an ADM for a SONET BLSR.

Figure 3:
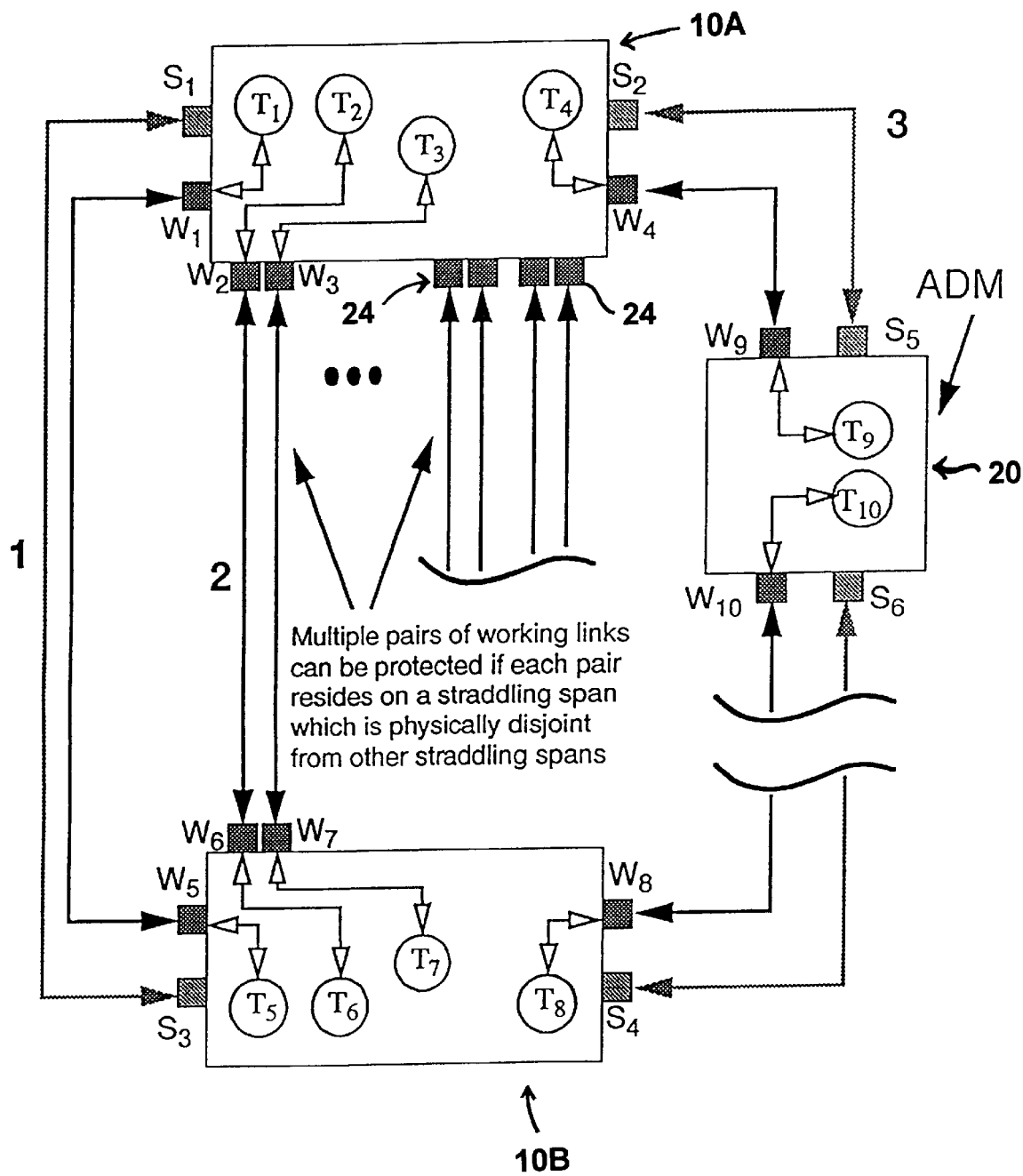
FIG. 3 is a schematic showing an exemplary network to demonstrate restoration for three span failures with a nodal switching device according to the invention.

Referring to FIG. 3, three nodal switching devices 10A and 10B and an add/drop multiplexer 20 are shown forming a capacity slice of a network that will be used to illustrate how the devices switch within themselves to restore a number of different span failures. Nodal switching device 10A is the same as nodal switching device 10, but includes additional straddling ports 24. Nodal switching device 10 shows the case where, at one node, the device 10 interfaces to a p-cycle and up to two units of capacity on one straddling span. There are, however, networking circumstances in which variants with 2, 4, 6 or more working ports 24 can usefully be provided on the southern face 14 (or straddling side) of the device 10A as shown in FIG. 3. The generalized device 10A functions like the device 10: Failure may be sustained on any two such "straddling side" interfaces 24, by switching their payload signals into the respective east and west direction spares S1, S2. However, there would be a difference in how failures are managed as follows:
1. No failures: Connect all working ports to/from the local working interface (input/output) ports (or internal add-drop multiplex tributary selector). Also, connect spare (east) to/from spare (west) to support failures on spans at other nodes and support ADM cooperation.
2. Failure of east cable span: Connect working (east) to/from spare (west).
3. Failure of west cable span: Connect working (west) to/from spare (east).
4. Failure of a 'south' cable span k (k in 1 to N): Connect working (south pair k, A) to/from spare (west) AND connect working (south pair k, B) to/from spare (east)

There may be any number of transmission interfaces on the southern "straddling" face 14. The device 10A in effect provides shared protection access to the two halves of the respective p-cycle on which it resides. At most two bidirectional straddling interface signal failures can be protected at once. Typically these would be associated with each other on the same physical span which has undergone a failure, but may be any two single working demand failures in the set of straddling spans interfaced to it. Thus there is an availability advantage also provided in the case of single, isolated failures, as opposed to outright cable cuts. Multiple pairs of working links can thus be protected if each pair resides on a straddling span that is physically disjoint from the other straddling spans.

In nodal switching device 10B, S4 is a spare (east) port, S3 is a spare (west) port, W8 is a working (east) port, W6 and W7 are working (south) ports and W5 is a working (west) port. In a conventional add/drop multiplexer 20, S5 is a spare (east) port, S6 is a spare (west) port, W9 is a working (east) port and W10 is a working (west) port.

FIG. 3 illustrates three possible span failures 1, 2 and 3. Span failure 1 is of a span, connecting a pair of the devices 10A, 10B, on the outside ring of the protection topology. The restoration of this failure is done in a manner similar to that of restoration in a BLSR ring and need not be further described. Span failure 2 is of a straddling span. Note that there are a number of straddling spans 24 on device 10A, each span carrying two complete line signals or sets of working channels. Nodal switching device 10A is able to restore any shared physical failure in this set of spans, unlike conventional network restoration systems, as it is able to restore the failure of a pair of oc-n line signals on this type of span. By comparison, rings can only restore a single oc-n line signal. Span failure 3 is similar to failure 1 but the restoration of the span is performed by cooperation of a nodal switching device 10B and a conventional ADM 20.

Figure 4:
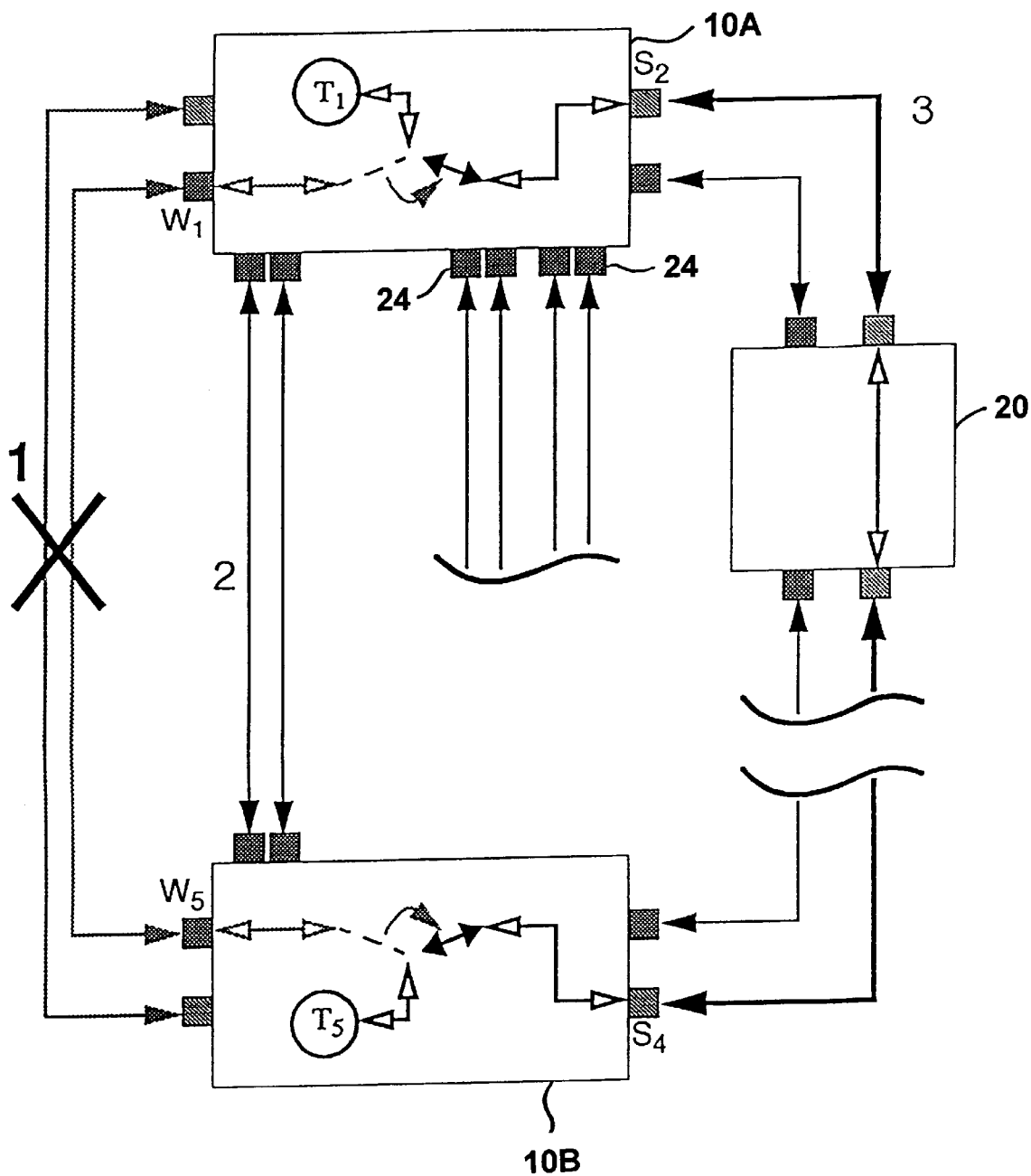
FIG. 4 is a schematic showing restoration of span failure 1 in FIG. 3.

In the following discussion, only the traffic sources that are affected by a failure will be shown. FIG. 4 shows restoration of span failure 1. When failure 1 takes place the traffic that was flowing between traffic sources T1 and T5 is severed. This severed traffic flow is restored by switching source T1 from working port W1 to spare port S2, and switching port T5 from working port W5 to spare port S4. Physically, this may be carried out using a mechanism similar to that used in a BLSR ring, and so can match the speed of rings.

Figure 5:
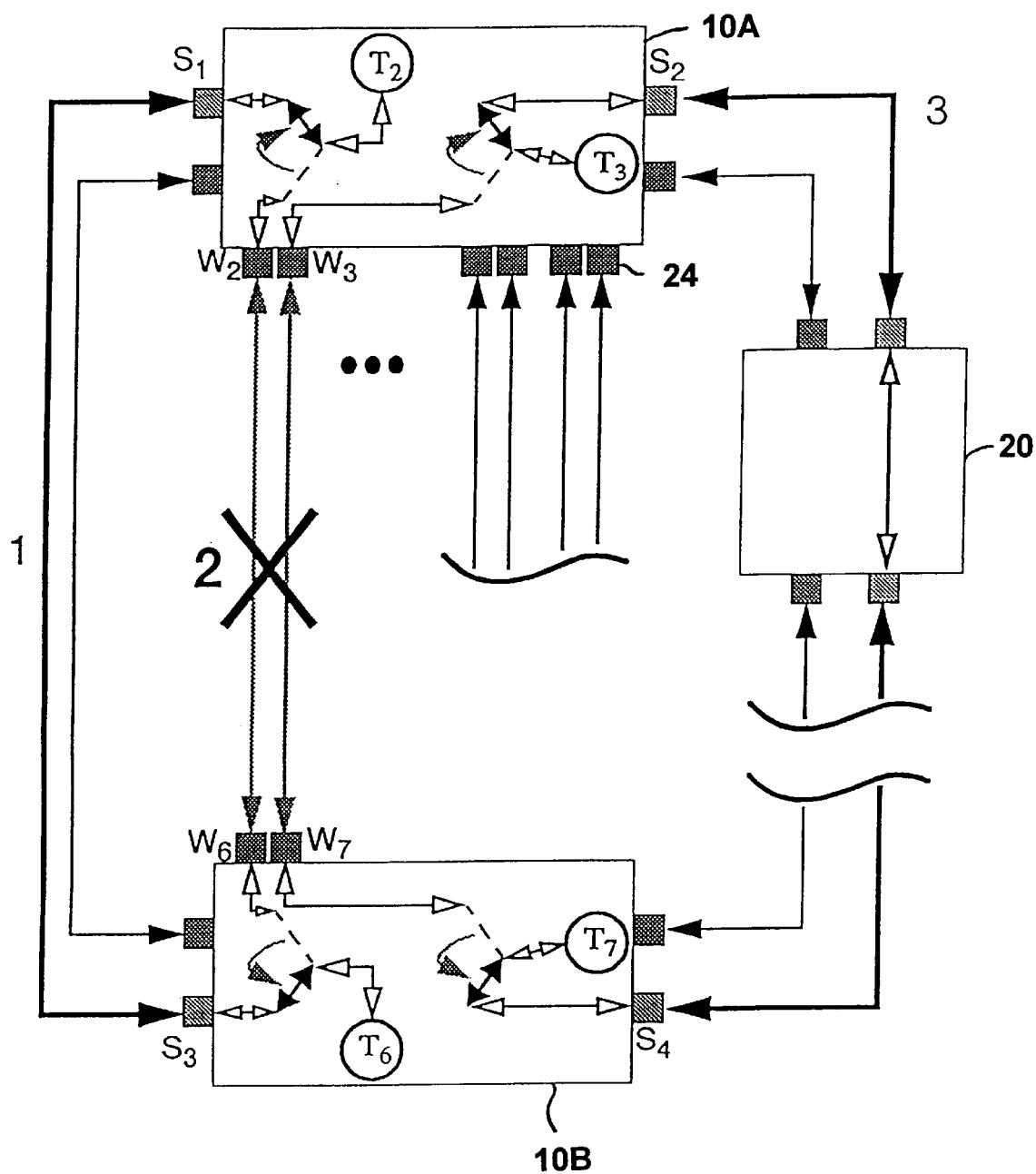
FIG. 5 is a schematic showing restoration of span failure 2 in FIG. 3.
Figure 6:
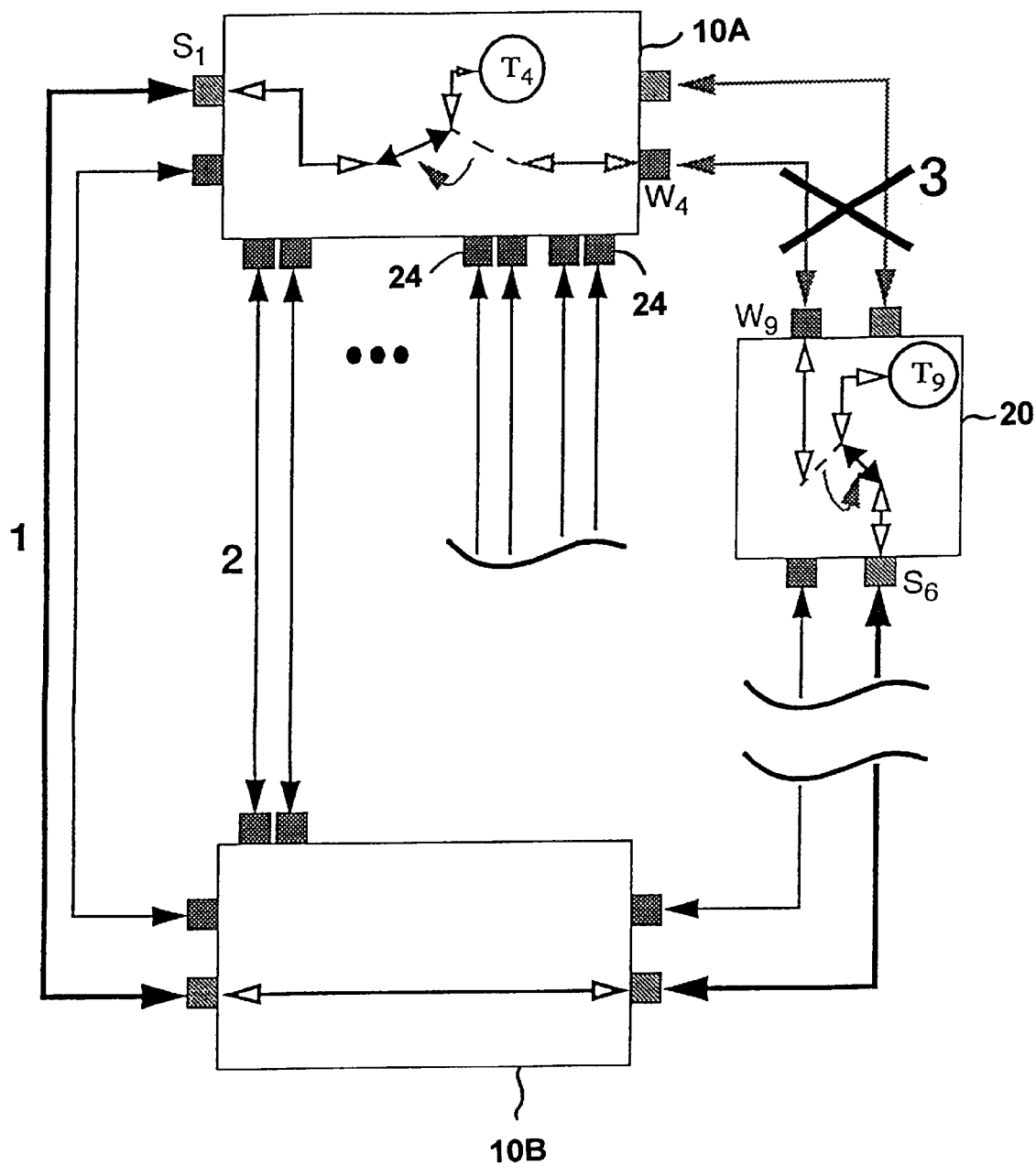
FIG. 6 is a schematic showing restoration of span failure 3 in FIG. 3.

FIG. 5 shows restoration of span failure 2. Failure 2 severs the flows between sources T2 and T6 and sources T3 and T7. The flows are restored by switching source T2 from working port W2 to spare port S1, source T6 from port W6 to spare port S3, source T3 from port W3 to spare port S2, and source T7 from port W7 to port S4. Thus the two severed working channels are restored using the two spare channels that result when the outer protection ring is bisected by span 2. As shown in FIG. 6, failure 3 is handled in a similar manner to failure 1, except that the restoration is handled between nodal switching device 10A and ADM 20.

Figure 7:
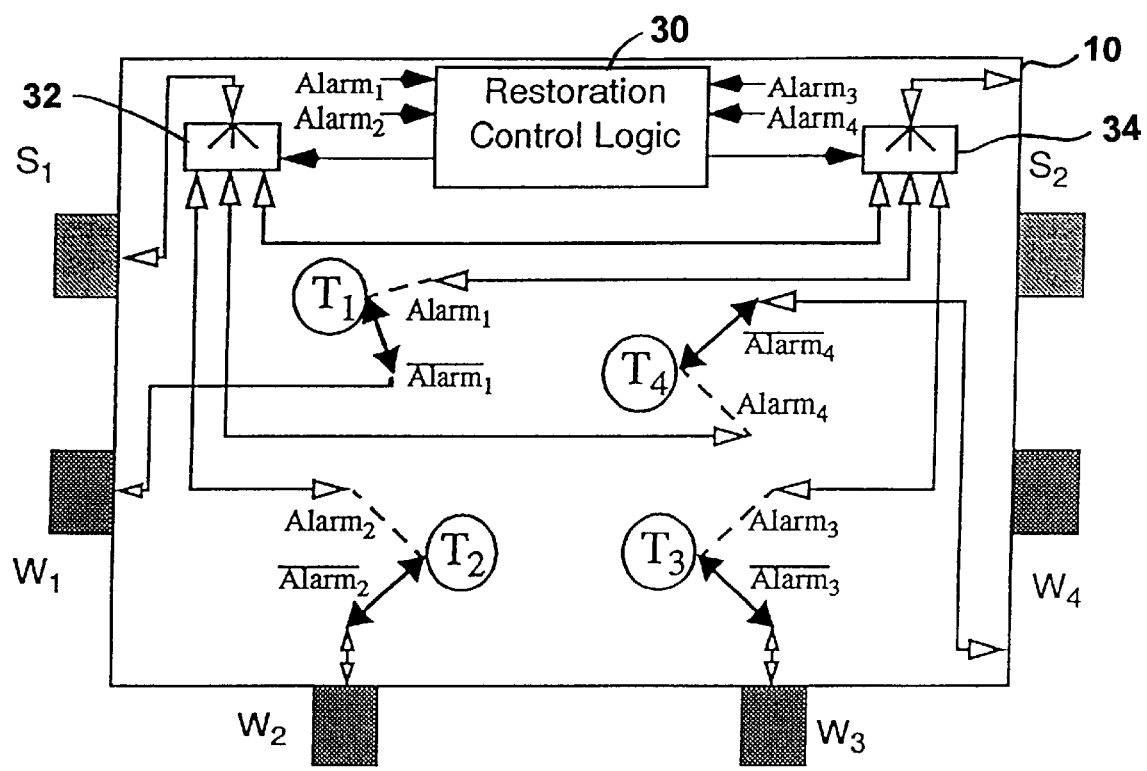
FIG. 7 is a schematic showing internal set-up for protection switching of a device according to FIG. 1.

FIG. 7 shows the internal working of device 10 (or 10A or 10B). The controller 30 contains the restoration control logic implemented in a computer in the manner discussed in this patent document. Switching devices 32 and 34, along with switching devices at the local interface ports T1–T4 represented by the bold bidirectional arrow and associated dashed connection line provide the switching of traffic to and from the spare ports S1 and S2. The switching devices are controlled by controller 30 in response to an alarm from one of the alarm bit feeds designated alarm 1–alarm 4. Alarm n is the alarm bit feed for working port n. The alarm conditions next to the bidirectional arrows and the associated dashed connection lines indicate when a connection is made on that particular branch of the switch. The alarm bit is high if there is an alarm condition, and low if operating normally. A connection is shown between the spare ports S1 and S2 because in normal operation these ports would be connected together. This is required so that intermediate nodes that are not alarmed pass the restoration signals of the alarmed nodes on the ends of a span failure.

Each working port has an alarm bit associated with it. If there is a failure, the corresponding alarm bit would be set and the restoration control logic would automatically activate the appropriate protection switch.

For example, in the normal operating condition, T1 is connected to W1 along the route signified by the bidirectional arrow at T1. In the case of an alarm condition on the span to which W1 is connected, traffic from T1 is switched to S2 via switch 34. All of the switching devices shown in FIG. 7 operate in like manner.

Figure 8:
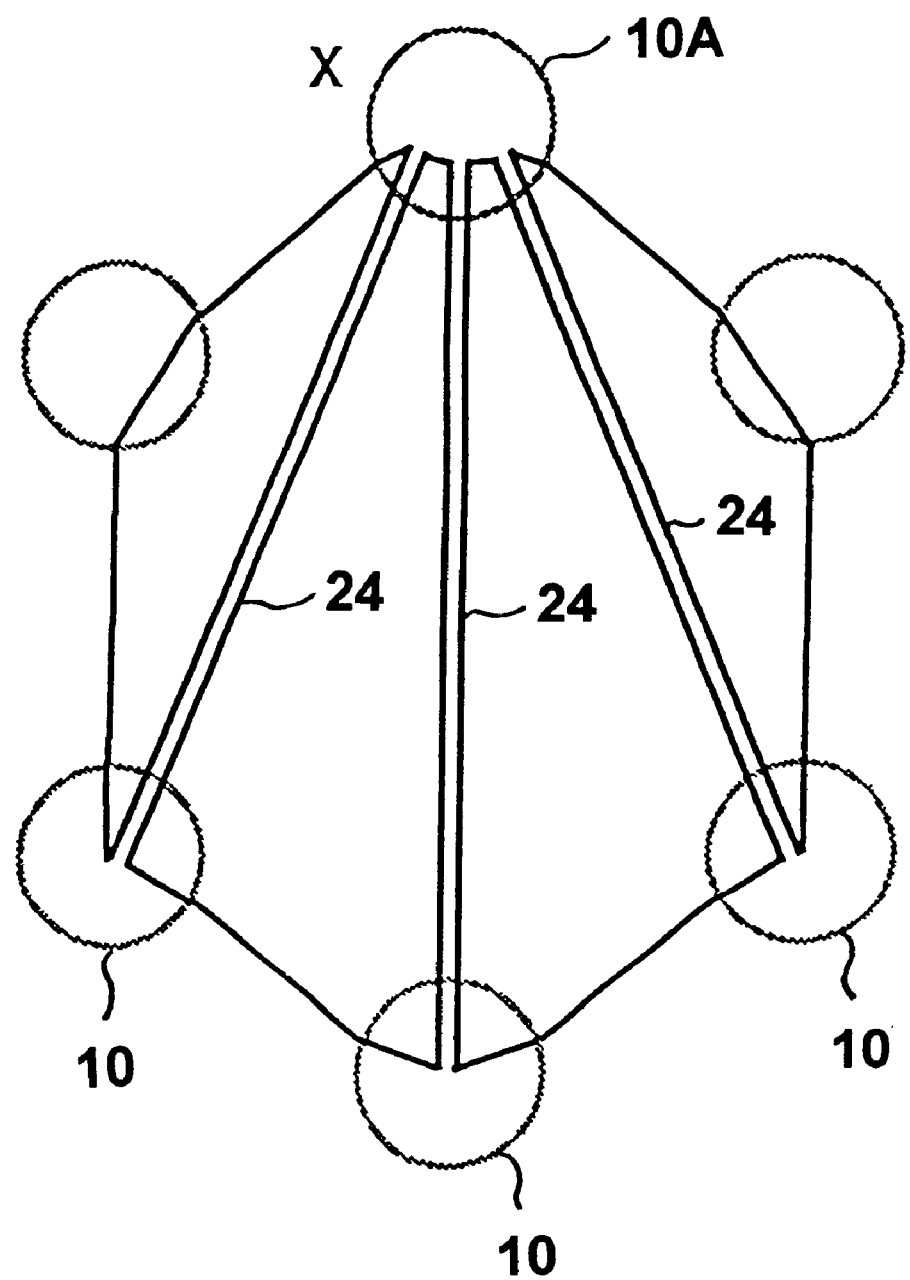
FIG. 8 is a schematic showing straddling links according to the invention.

FIG. 8 shows three pairs of working links 24 on three straddling spans. Node X requires eight working ports (three ports for the three straddling spans plus the ports in the protection ring. The limit on the number of working channels on each straddling span is 2 as only two links on such a span can be restored by the outer ring of spare links (by routing both ways around the protection ring). The maximum working channels on a non-straddling span (that is, a span with protection capacity on it) is 1, as in a p-cycle (by routing the other way round the failure through the protection ring.

The advantage of such a nodal switching device 10 is primarily as a more economic alternative to DCS machines. P-cycle 'capacity' slice devices, as described above, can be deployed as and when needed, rather than requiring a large one-time commitment to establish a full-blown DCS node. In an era of DWDM transport this may be a more common requirement in many sites which need to receive only one or a few fibers, or even only a few wavelengths, to have all their capacity needs satisfied. In such a case, a single DWDM p-cycle device could suffice at that node to provide survivable transport for all its needs, through access to up to four working fibers (or wavelengths) and a single spare capacity p-cycle of the network.

The properties of the nodal switching device 10 puts the device in a unique middle ground in terms of a networking element architecture between ring ADMs and full-blown digital cross connect (DCS) systems. It is characteristically like an ADM in that it is has a precise discrete capacity. Many devices may be independently employed ("stacked up") at a site as needed for the total demand flowing through the location. This property is widely considered one of the benefits of rings over DCS which are large complete switching systems interfacing all the transmission capacity arriving at a node. But unlike an ADM, they provide a specific extra form of access (to the same amount of spare capacity as in a ring) to working signal units. Specifically up to two working signals may be accommodated per device if they arrive on spans that are physically distinct from East and West spans, and, at the network level, bear a "straddling" relationship to the p-cycle on which the respective device is placed.

In practice, nodal degrees, d, are from 2 to 7 in the physical fiber route graphs of typical networks. In a degree 2 site, a conventional ADM is the only meaningful choice. In all higher degree sites, however, there is an applications range for devices that support up to (d-2) "straddling side" interfaces. Thus, this invention provides for a novel networking optical product line that is characteristically like an ADM in that it is a 'capacity slice" device, but that supports far higher networking efficiencies, depending on the application site through a number of optional plug in "straddling side" signal interface port pairs. Whereas an ADM has redundancy=total spare/total working=100%, a p-cycle networking device would have redundancy:

$$R = \frac{1}{k+1}$$

where k is the number of straddling spans interfaced at the site. A degree 5 site, could then have an individual nodal redundancy as low as 25% (i.e., k=3).

A person skilled in the art could make immaterial modifications to the invention described in this patent document without departing from the essence of the invention that is intended to be covered by the scope of the claims that follow.

We claim:

1. A telecommunications network, the telecommunications network incorporating plural nodes connected in a ring and having at least one straddling span, wherein a nodal switching device terminates the straddling span, the nodal switching device forming an add-drop multiplexer and the nodal switching device comprising:

a first network interface having a first spare port and a first working port;

a second network interface having a second spare port and second working port;

a third network interface having third and fourth working ports, the third network interface connecting to the straddling span;

plural local interface ports, each local interface port being connected by a communication link within the nodal switching device with an associated one of the first, second, third and fourth working ports and being connectable by a communication link within the nodal switching device with each of the spare ports;

each communication link including an internal switching device;

a controller operably connected to each internal switching device; and the controller being configured to route traffic from one of the third and fourth working ports to one of the first and second spare ports upon occurrence of a failure on a span connected to the one of the third and fourth working ports.

2. The telecommunications network of claim 1 in which, in the nodal switching device, the third and fourth working ports have equal total capacity to the total spare capacity on each of the first and second network interfaces.

3. The telecommunications network of claim 1 in which:

the nodal switching device terminates plural straddling spans;

the third network interface has plural pairs of working ports, each pair of working ports being connected to an associated one of the straddling spans; and the nodal switching device has plural local interface ports, each of the plural local interface ports being connected by a communication link within the nodal switching device with an associated one of the plural pairs of working ports and being connectable by a communication link within the nodal switching device with each of the spare ports, with each communication link including an internal switching device controlled by the controller to route traffic from the plural pairs of working ports to one of the first and second spare ports upon occurrence of a failure on a straddling span connected to one the plural pairs of working ports.

4. The telecommunications network of claim 1 in which the straddling span provides only working capacity.

5. A method of operating a telecommunications network, in which the telecommunications network is formed from plural nodes, each node incorporating an add-drop multiplexer with a first network interface having a first spare port and a second network interface having a second spare port, the method comprising the steps:

providing at least one straddling path in the network, the straddling path connecting between a first node and a second node, the first node incorporating a third network interface that connects to the straddling path and the second node incorporating a third network interface that connects to the straddling path; and at plural nodes in the network, connecting the first spare port of each node to the second spare port of each node to form preconfigured cycles of spare capacity, such that upon occurrence of a failure of a span in the straddling path, communications may be routed from the straddling span along nodes in one of the preconfigured cycles of spare capacity.

6. The method of claim 5 in which routing communications along nodes in the preconfigured cycle of spare capacity comprises switching communications from the third network interface of each of the first node and the second node to a spare port on one of the first network interface and the second network interface of the respective first node and second node.

7. The method of claim 5 in which the straddling path comprises a single span.

8. The method of claim 5 in which the straddling span provides only working capacity.

9. The method of claim 5 further comprising, upon failure of a span in the straddling path, routing communications from the straddling span along nodes in one of the preconfigured cycles of spare capacity.

10. A telecommunications network, comprising:

plural nodes, each node comprising an add-drop-multiplexer incorporating a first network interface having a first spare port and a second network interface having a second spare port; and at least one straddling path in the network, the straddling path connecting between a first node and a second node, the first node incorporating a third network interface that connects to the straddling path and the second node incorporating a fourth network interface that connects to the straddling path.

11. The telecommunications network of claim 10 in which, at each node in the network the first spare port of the node is connected to the second spare port of the node to form preconfigured cycles of spare capacity.

12. A telecommunications network, comprising:

plural nodes, each node comprising an add-drop-multiplexer incorporating a first network interface having a first spare port and a second network interface having a second spare port; and at least one straddling path in the network, the straddling path connecting between a first node and a second node, the first node incorporating a third network interface that connects to the straddling path and the second node incorporating a fourth network interface that connects to the straddling path; and the at least one straddling path providing only working capacity.

13. The telecommunications network of claim 12 in which, at each node in the network, the first spare port of the node is connected to the second spare port of the node to form preconfigured cycles of spare capacity.

14. The telecommunications network of claim 13 in which each node comprises a controller configured so that, upon occurrence of a failure of a span in the straddling path, communications from the straddling span are routed along nodes in one of the preconfigured cycles of spare capacity.

* * * * *

UNITED STATES PATENT AND TRADEMARK OFFICE
CERTIFICATE OF CORRECTION

PATENT NO. : 6,404,734 B1
DATED : June 11, 2002
INVENTOR(S) : S. Stamatelakis et al.

It is certified that error appears in the above-identified patent and that said Letters Patent is hereby corrected as shown below:

Title page,
Item [56], References Cited, OTHER PUBLICATIONS,
"Restoration copy not supplied." should read -- Restoration. --

FOREIGN PATENT DOCUMENTS, insert in appropriate order:
-- WO   WO 97/11543  3/1997
   WO   WO 97/08860  3/1997
   WO   WO 97/06645  2/1997
   WO   WO 97/06644  2/1997
   WO   WO 97/06643  2/1997 --

Item [74], *Attorney, Agent, or Firm*, "O'connor;" should read -- O'Connor --

Column 7,
Line 16, "the second node incorporating a third" should read -- the second node incorporating a fourth --

Column 8,
Line 13, "in the network" should read -- in the network, --

Signed and Sealed this

Twenty-fifth Day of March, 2003

JAMES E. ROGAN
*Director of the United States Patent and Trademark Office*